US009563617B2

(12) United States Patent
Marimuthu et al.

(10) Patent No.: US 9,563,617 B2
(45) Date of Patent: Feb. 7, 2017

(54) CUSTOM VALIDATION OF VALUES FOR FIELDS OF SUBMITTED FORMS

(71) Applicant: Oracle International Corporation, Redwood Shores, CA (US)

(72) Inventors: Prabhakaran Marimuthu, Chennai (IN); Tony P Thomas, Changanacherry (IN)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 14/033,530

(22) Filed: Sep. 23, 2013

(65) Prior Publication Data

US 2015/0089345 A1    Mar. 26, 2015

(51) Int. Cl.
G06F 9/44 (2006.01)
G06F 7/00 (2006.01)
G06F 17/24 (2006.01)

(52) U.S. Cl.
CPC .................... G06F 17/243 (2013.01)

(58) Field of Classification Search
None
See application file for complete search history.

(56) References Cited

U.S. PATENT DOCUMENTS

| 5,418,957 A * | 5/1995 | Narayan ...................... 717/113 |
| 5,515,492 A * | 5/1996 | Li ........................... G06Q 10/10 715/744 |
| 5,710,901 A * | 1/1998 | Stodghill .......... G06F 17/30303 714/57 |
| 5,875,330 A * | 2/1999 | Goti .............................. 717/104 |
| 6,185,583 B1 * | 2/2001 | Blando ......................... 715/210 |
| 6,192,381 B1 * | 2/2001 | Stiegemeier .......... G06F 17/211 715/210 |
| 6,535,883 B1 * | 3/2003 | Lee et al. ...................... 707/694 |

(Continued)

FOREIGN PATENT DOCUMENTS

EP        1391818 A2      2/2004
WO    2001014962 A1      3/2001

OTHER PUBLICATIONS

Kelley C. Bourne, Testing Client/Server Systems, published by McGraw-Hill, Inc, 1997, pp. 469-477.*

(Continued)

*Primary Examiner* — Tuan Q. Dam
*Assistant Examiner* — Zheng Wei
(74) *Attorney, Agent, or Firm* — IPHorizons PLLC; Narendra Reddy Thappeta

(57) ABSTRACT

A server system provided according to an aspect of the present disclosure receives validation rules for fields of a form, and stores the validation rules as metadata in a memory. When values are later received based on the form, the values are validated using the rules in the metadata. Any errors detected are notified to a user system from which the values are received. The values are forwarded to a corresponding application if no errors are detected. According to another aspect, a developer of the application provides an initial set of validation rules prior to the application being deployed at a customer site. The customer then specifies additional rules. The metadata stores both the initial rules and the additional rules. A user interface module validates each received value against any applicable rules present in the metadata.

17 Claims, 13 Drawing Sheets

(56) References Cited

U.S. PATENT DOCUMENTS

| | | | | |
|---|---|---|---|---|
| 6,654,932 B1* | 11/2003 | Bahrs | ........................ | G06F 8/38 |
| | | | | 715/210 |
| 6,938,214 B2 | 8/2005 | Proulx et al. | | |
| 7,124,145 B2* | 10/2006 | Surasinghe | | |
| 7,366,977 B2* | 4/2008 | Chokshi | ........................ | 715/209 |
| 7,418,484 B2 | 8/2008 | Presley | | |
| 7,558,737 B2 | 7/2009 | Sudhi | | |
| 7,599,942 B1* | 10/2009 | Mohamad | | |
| 7,610,294 B2* | 10/2009 | Borgsmidt | | |
| 7,650,315 B2* | 1/2010 | Wiest et al. | .................. | 705/400 |
| 7,711,753 B2* | 5/2010 | Krishnaswamy et al. | .... | 707/802 |
| 7,873,541 B1* | 1/2011 | Klar | ................. | G06Q 10/08345 |
| | | | | 705/14.1 |
| 7,913,159 B2 | 3/2011 | Larcheveque et al. | | |
| 7,925,513 B2 | 4/2011 | Chao et al. | | |
| 8,156,420 B2* | 4/2012 | Nie | ........................ | G06F 17/243 |
| | | | | 715/221 |
| 8,201,234 B2* | 6/2012 | Diaz-Cuellar | .......... | H04L 63/20 |
| | | | | 709/200 |
| 8,214,409 B2 | 7/2012 | O'Farrell et al. | | |
| 8,250,534 B2* | 8/2012 | Skriletz | ..................... | G06F 8/10 |
| | | | | 717/105 |
| 8,280,919 B2* | 10/2012 | Krishnaswamy et al. | .... | 707/803 |
| 8,418,124 B2* | 4/2013 | Turner | ................... | G06F 21/629 |
| | | | | 717/101 |
| 8,473,910 B2* | 6/2013 | Skriletz | ..................... | G06F 8/20 |
| | | | | 717/105 |
| 8,589,452 B2* | 11/2013 | Ovsyannikov et al. | ...... | 707/805 |
| 8,606,599 B1* | 12/2013 | Wong | ..................... | G06F 19/363 |
| | | | | 705/2 |
| 8,782,744 B1* | 7/2014 | Fuller | ..................... | H04L 63/10 |
| | | | | 709/225 |
| 9,026,580 B2* | 5/2015 | Ramanathan | ........... | G06F 21/64 |
| | | | | 707/690 |
| 9,367,586 B2* | 6/2016 | Hans | ................. | G06F 17/30507 |
| 2003/0146937 A1* | 8/2003 | Lee | ....................... | G06F 9/4443 |
| | | | | 715/781 |
| 2004/0189708 A1* | 9/2004 | Larcheveque et al. | ....... | 345/780 |
| 2004/0226002 A1* | 11/2004 | Larcheveque et al. | ....... | 717/126 |
| 2005/0108625 A1* | 5/2005 | Bhogal et al. | ................ | 715/505 |
| 2005/0125438 A1* | 6/2005 | Krishnaswamy et al. | .... | 707/102 |
| 2005/0125806 A1* | 6/2005 | Bussler et al. | ................. | 719/316 |
| 2005/0160065 A1* | 7/2005 | Seeman | ............ | G06F 17/30867 |
| 2006/0053083 A1* | 3/2006 | Wiest et al. | ..................... | 705/80 |
| 2007/0083805 A1 | 4/2007 | Randazzo et al. | | |
| 2007/0083853 A1* | 4/2007 | Cook | ........................ | G06F 8/38 |
| | | | | 717/120 |
| 2007/0288903 A1* | 12/2007 | Manglik | ................... | G06F 8/60 |
| | | | | 717/124 |
| 2008/0109715 A1* | 5/2008 | Stover | ................. | G06F 17/2247 |
| | | | | 715/237 |
| 2008/0282313 A1* | 11/2008 | Diaz-Cuellar | .......... | H04L 63/20 |
| | | | | 726/1 |
| 2008/0301155 A1* | 12/2008 | Borgsmidt | ............. | G06Q 10/04 |
| 2008/0306910 A1* | 12/2008 | Singh | ............................... | 707/3 |
| 2009/0198706 A1* | 8/2009 | Sanders | ........................ | 707/100 |
| 2009/0204819 A1* | 8/2009 | Parker | .......................... | 713/182 |
| 2009/0328067 A1 | 12/2009 | Srinivasan et al. | | |
| 2010/0146014 A1* | 6/2010 | Ionescu et al. | ............... | 707/810 |
| 2010/0218167 A1* | 8/2010 | Turner | ................... | G06F 21/629 |
| | | | | 717/120 |
| 2011/0252333 A1* | 10/2011 | Porcari | ................... | G06Q 10/10 |
| | | | | 715/743 |
| 2011/0270807 A1* | 11/2011 | Maturana et al. | ........... | 707/690 |
| 2012/0310904 A1* | 12/2012 | Hans | ................. | G06F 17/30507 |
| | | | | 707/694 |
| 2012/0310905 A1* | 12/2012 | Hans | ................. | G06F 17/30507 |
| | | | | 707/694 |
| 2013/0205189 A1* | 8/2013 | DiPierro et al. | .............. | 715/224 |
| 2013/0304712 A1* | 11/2013 | Meijer | ............... | H04N 21/2365 |
| | | | | 707/694 |
| 2013/0304713 A1* | 11/2013 | Roy-Faderman | ............. | 707/702 |
| 2015/0066250 A1* | 3/2015 | Garzella | ................. | B64D 43/00 |
| | | | | 701/3 |
| 2015/0089354 A1* | 3/2015 | Abrahami | ........... | G06F 17/3089 |
| | | | | 715/235 |

OTHER PUBLICATIONS

Brabrand et al., PowerForms: Declarative Client-Side Form Field Validation, Published by BRICS, Department of Computer Sceience, University of Aarhus, 2000, pp. 1-24.*

Catalogue System, http://www.synertrade.com/application/article/catalogue-system.html, downloaded circa Feb. 28, 2013, pp. 1-2.

ERP Testing Solutions, http://www.arsin.com/download/Arsin_ERP_Testing.pdf, downloaded circa Feb. 26, 2013, pp. 1-2.

InfoPath 2010 features and benefits, http://office.microsoft.com/en-in/infopath/infopath-2010-features-and-benefits-HA101806949.aspx, downloaded circa Feb. 28, 2013, pp. 1-2.

Master Data management Made Simple, http://www.aimasoft.com/about_us.htm, downloaded circa Feb. 28, 2013, pp. 1-1.

NAV Movement Analysis, http://www.aimasoft.com/about_us.htm, http://www.milestonegroup.com.au/index.php/modules/nav-control/nav-movement-analysis/, downloaded circa Feb. 28, 2013, pp. 1-3.

Order and Contract Processing for the Telecommunications Industry, http://help.sap.com/saphelp_crm700_ehp01/helpdata/en/b9/f9bff1c158404083de6a1debec7f86/content.htm?frameset=/en/37/f7629d516340f6a83c53025ad72266/frameset.htm, downloaded circa Feb. 28, 2013, pp. 1-1.

SOA Software Announces Repository Manager to Simplify building Enterprise SOABank of AmericaSOA, http://www.pressreleasepoint.com/soa-software-announces-repository-manager-simplify-building-enterprise-soabank-americasoa-software-a, downloaded circa Feb. 28, 2013, pp. 1-114.

Validation Framework , http://help.sap.com/erp2005_ehp_05/helpdata/en/80/132c41eda5f423e10000000a155106/content.htm?frameset=/en/41/05ce40c3e10366e10000000a1550b0/frameset.htm, downloaded circa Feb. 28, 2013, pp. 1-2.

* cited by examiner

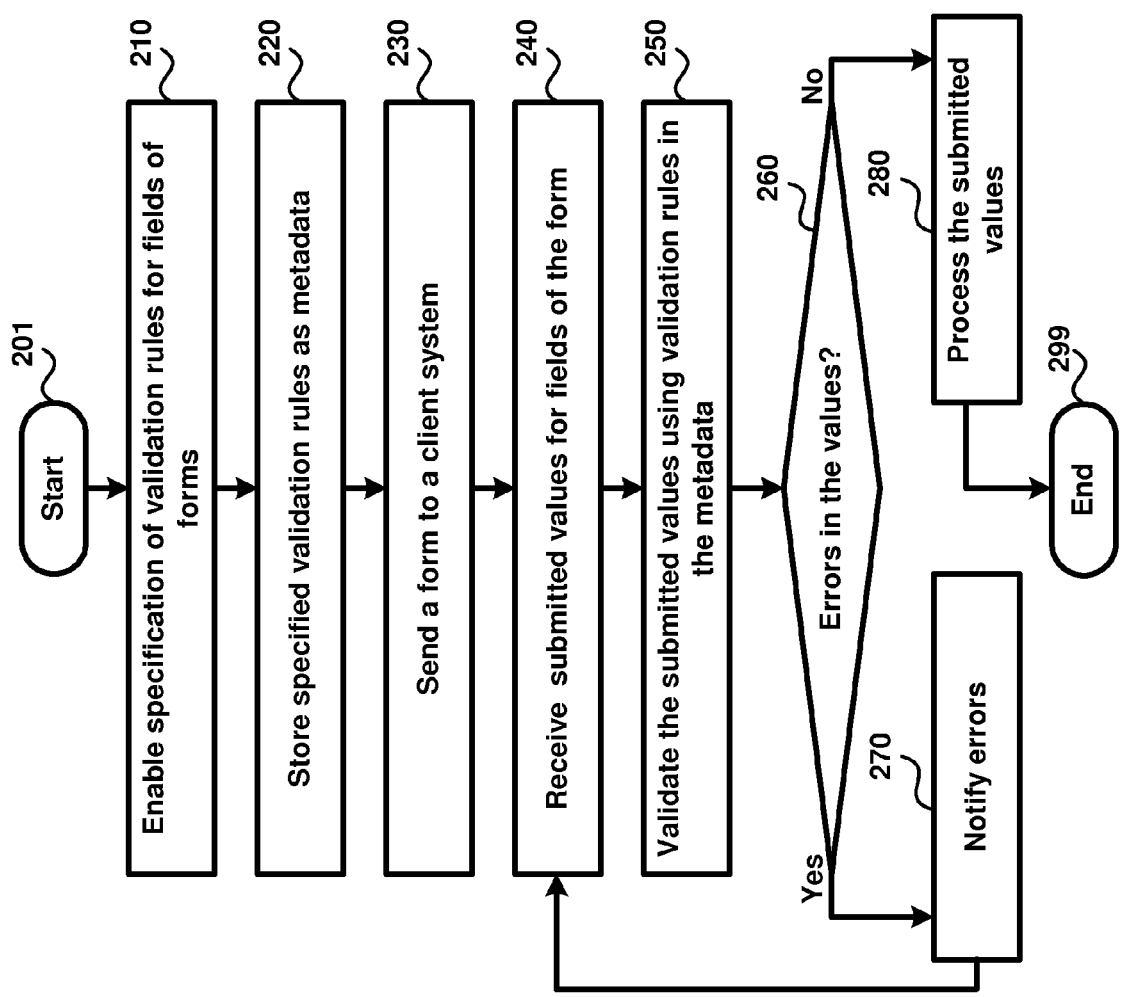

FIG. 4

Browser — 400

Tabs: Billing Plan General | Events | Tax Parameters | History

410
- Contact: ASSET_BUILD_CONTRACT
- Sold To Customer: 1006 — Sara Outdoor
- Bill Plan: B101
- BI Unit: US001
- Bill To: 1006
- Currency: USD
- Form Id: CA_BILLPLAN — 450
- Sara Outdoor

- Description: _____
- *Billing Status: _____
- Actions
- Billing Method: _____
- ☐ Hold

Customer Information
- B1 unit: US001 NEW YORK OPERATIONS
- *Bill To Customer: Sara Outdoor
- Addr Num: _____
- Bill To Contact: Jeffreys Jenny

Transaction Options
- Retainage Options
- Items previously held as Retainages
- ○ Bill   ○ Write-off   ○ Hold

Billing Options
- Bill Type: _____
- Bill Source: _____   ☐ Pre Approved
- Summarization Template ID: _____   ☐ Direct Invoice
- Purchase Order: _____

Tolerance Options
- Minimum Bill Amount: 000
- ☐ Final Bill

- Billing Header Note: Internal Notes   Preview Summarization Template

Billing Defaults Overrides
- Invoice Form
- Cycle ID
- Bill By ID
- Payment Method
- Payment Terms
- Billing Inquiry
- Billing Specialist
- Billing Authority

490
- 490A Submit/Save
- 490B Cancel

| Browser | | | | | | □ ⊡ ✕ |
|---|---|---|---|---|---|---|
| Validation Template | User List ⟋580B | | | | | |
| 580A | | | | | | |

Owner ID  Contracts  
Template ID  BILLING PLAN ⟋510  
Security Template Type  Role  ⟋520A  
Status  Active  ⟋530  
*Description  Role ⟋520B  
Role Name  Cash Manager | GBL ⟋520C

Validation Component  Find | View all  First ◁ 1 of 1 ▷ Last

Component Name  CA_BILLPLAN  ⟋550 Define Bill Plan  
Trigger Field  Billing Status  ⟋555A Market | GBL  
Value to Match  RDY  ⟋555B ▽ Required Fields Combination  Find | View 1

*Combination Number  1  ⟋551A  Description  Payment Method & Terms

Field List  ⟋565B  Personalize | Find | View All  First ◁ 1-2 of 2 ▷ Last

| | Select | Record | Field Name | Field Label | | |
|---|---|---|---|---|---|---|
| 1 | Select ⟋565A | CA_BILL_PLAN | PAYMENT_METHOD ⟋565C | Payment Method ⟋565D | + | - |
| 2 | Select | CA_BILL_PLAN | PYMNT_TERMS_CD | Payment Terms | + | - |

560A  565A

*Combination Number  2  ⟋551B  Description  Cycle ID

Field List  Personalize | Find | View All  First ◁ 1 of 1 ▷ Last

| | Select | Record | Field Name | Field Label | | |
|---|---|---|---|---|---|---|
| 1 | Select | CA_BILL_PLAN | BILL_CYCLE_ID | Cycle ID | + | - |

560B

Value Edits

Field: Business Unit  ⟋570A  Secure List Id: BUS_UNIT ⟋570B  
Field: Billing Unit  Secure List Id: BI_UNIT

570

Created By  BP1  Last Updated Date/Time  07/30/13 9:45:03AM  ⟋590  
Last Updated User ID  VP1  2

Save      Return to Search

FIG. 5A

| Browser | | | | | | | | □ | X |
|---|---|---|---|---|---|---|---|---|---|

Validation Template | User List — 580B

580A

Owner ID  Contracts
Template ID  BILLING PLAN — 520A         *Description  Role — 520B
Security Template Type  Role                        Role Name  Cash Manager
Status  Active

Validation Fields

Select the page name from the list

| Select Page | Personalize | Find | View All | First 1-5 of 11 Last |
|---|---|
| | Page Name |
| 1 | Billing Plan ← 510 |
| 2 | Billing Plan Lines |
| 3 | Recurring Detail |
| 4 | Billing Fee Worksheet |
| 5 | Events |

Select the field to be secured/validated

| Select Page | | Personalize | Find | View 10 | First 1-38 of 38 Last |
|---|---|---|---|
| | Field Name | Record (Table) Name | Field Name |
| 21 | Purchase Order | CA_BILL_PLAN | PO_REF |
| 22 | Invoice Form | CA_BILL_PLAN | INVOICE_FORM_ID |
| 23 | Cycle ID | CA_BILL_PLAN | BILL_CYCLE_ID |
| 24 | Bill By ID | CA_BILL_PLAN | BILL_BY_ID |
| 25 | Payment Method | CA_BILL_PLAN | PAYMENT_METHOD |
| 26 | Payment Terms | CA_BILL_PLAN | PYMNT_TERMS_CD |
| 27 | Billing Inquiry | CA_BILL_PLAN | BILL_INQUIRY_PHONE |
| 28 | Billing Specialist | CA_BILL_PLAN | BILLING_SPECIALIST |
| 29 | Billing Authority | CA_BILL_PLAN | BILLING_AUTHORITY |
| 30 | Negotiated Amount | CA_BILL_PLAN | GROSS_AMT |
| 31 | Business Ubnit | CA_BILL_PLAN | BI_UNIT |

Cancel

Validation Component

Component Name  CA_BILLPLAN
Trigger Field  Billing Status
Value to Match  RDY

▷ Required Fields Combination

*Combination Number  1 — 551A

560A

Field List

| | Select | |
|---|---|---|
| 1 | Select — 565A | CA_ |
| 2 | Select | CA_ |

*Combination Number  2 — 551

560B

Field List

| | Select | |
|---|---|---|
| 1 | Select | CA_ |

570 Value Edits
Field: Business Unit — 560A
Field: Billing Unit

Created By  BP1
Last Updated User ID  VP1 | 2

*FIG. 5B*

Browser

Secure List Id: BUS_UNIT  595A
Description: Business Unit List

Field Type: Character

List Details

595B {
List Type: Range
From: US001    To: US004
From: AUS01   To: AUS02

595C {
List Type: Values
Value: FRA01
Value: US008
Value: NLS01
Value: GBR03

| | 662 | 663 | 664 | 665 | 666 | 667 | 668 | 669 | 670 | 671 | 672 |
|---|---|---|---|---|---|---|---|---|---|---|---|
| | TEMPLATE_ID | SEC_TEMPL ATE-TYPE | EFF_STATUS | ROLENAME | DESCR | CREATED _BY | CREATED_DTTM | LASTUPDOPRID | LASTUPDDTTM | TRIGGER FIELD | TRIGGER VALUE |
| 1 → | BILLING PLAN | R | A | Cash Manager | Billing Plan | BP1 | 08-May-13 07.42.44.00000 AM | VP1 | 31-JUL-13 12.05.44.00000 AM | Billing Status | RDY |
| 2 | | | | | | | | | | | |

| | 612 | 613 | 614 | 615 | 616 | 617 |
|---|---|---|---|---|---|---|
| | TEMPLATE _ID | PLNGRP NAME | COMBINATION _NO | RECNAME | FIELDNAME | LBLTEXT |
| 601 → 1 | BILLING PLAN | CA_BILL PLAN | 1 | CA_BILL PLAN | PAYMENT_ METHOD | Payment Method |
| 602 → 2 | BILLING PLAN | CA_BILL PLAN | 1 | CA_BILL PLAN | PAYMENT_ TERMS_CD | Payment Terms |
| 603 → 3 | BILLING PLAN | CA_BILL PLAN | 2 | CA_BILL PLAN | BILL_CYCLE _ID | Cycle ID |
| 4 | | | | | | |

Browser

| Billing Plan General | Events | Tax Parameters | History |

| | | |
|---|---|---|
| Contact | CA_BUILD_PLAN | B1 Unit US001 ~560C Form Id : CA_BILLPLAN ~450 |
| Sold To Customer | 1006 Sara Outdoor | Bill To 1006 |
| Bill Plan | B101 | Currency USD Sara Outdoor |

Description _____   *Billing Status [Ready ▽]   Actions
Billing Method [As Incurred ▽]                        ☐ Hold

Customer Information

B1 unit [US001]                                       Transaction Options
*Bill To Customer [1006] 🔍   US001 NEW YORK OPERATIONS
Addr Num [1] 🔍                Sara Outdoor           Ratainage Options        Bill Currency | Contact Currency ▽
Bill To Contact [5] 🔍         Jeffreys Jenny         Items previously held as Retainages
                                                      ○ Bill    ○ Write-off    ○ Hold

Billing Options

Bill Type [CA] 🔍              ☐ Pre Approved         Tolerance Options
Bill Source [CONTRACTS] 🔍     ☐ Direct Invoice
Summarization Template ID ____ 🔍                     Minimum Bill Amount [000]
Purchase Order _____

Billing Header Note [Internal Notes]   Preview Summarization Template    ☐ Final Bill

Billing Defaults Overrides

Invoice Form _____ 🔍 ~712
Cycle ID _____ 🔍
Bill By ID _____ 🔍 ~713
Payment Method _____ ~714
Payment Terms _____ 🔍
Billing Inquiry _____
Billing Specialist _____
Billing Authority _____

~490

[Submit/Save] [Cancel]
  490A      490B

FIG. 8

CUSTOM VALIDATION OF VALUES FOR FIELDS OF SUBMITTED FORMS

BACKGROUND OF THE DISCLOSURE

Technical Field

The present disclosure relates to forms management and more specifically to custom validation of values for fields of submitted forms.

Related Art

Forms are often the basis for facilitating user interactions. In a common scenario, an enterprise application sends a form for display, with the form containing relevant data for display to a user and also some fields for the user to enter corresponding values. As is well known in the relevant arts, a field permits a user to enter (or specify) a value for a field, possibly using elements such as drop-down menus, text field, etc.

A form is said to be submitted when the values entered for fields are sent for further processing by the application (which has caused the form to be sent earlier), upon user actions such as clicking on a 'submit' button. The submission causes the entered values to be transmitted on a network for examination by the application, in case of enterprise applications in which the user interacts with the enterprise applications over a network.

Values submitted for fields are often required to be validated. Validation generally refers to ensuring that a submitted value satisfies preliminary criteria such as having to be an integer, is according to a desired format (e.g., MM/YYYY to specify month and year), in addition to more complex criteria such as ensuring that values are provided for 'mandatory' fields, value is within a desired range, etc. Such validations may be used to force users to provide all necessary data according to corresponding requirements, in addition to avoiding erroneous data for subsequent processing.

There is often a need for custom validation of values for fields of submitted forms. For example, different customer organizations deploying an enterprise application may have their own specific requirements, and each customer organization may wish to specify their own validation rules for fields of interest to them.

Aspects of the present disclosure provide for custom validation of values for fields of submitted forms.

BRIEF DESCRIPTION OF THE DRAWINGS

Example embodiments of the present disclosure will be described with reference to the accompanying drawings briefly described below.

FIG. 2 is a flow chart illustrating the manner in which validation of values entered for fields of forms are performed in one embodiment.

FIG. 4 depicts a form initially displayed to a user to enter values for fields in an embodiment.

FIGS. 5A-5D together illustrates an example approach enabling a customer to specify validation rules for fields of forms in an embodiment.

FIGS. 6A and 6B together depicts the manner in which validation rules are maintained in an embodiment.

FIG. 7 depicts a form with input values entered by a user for fields, in an embodiment.

FIG. 8 depicts display of an error message upon detection of non-compliance with an applicable validation rule, in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

A server system provided according to an aspect of the present disclosure receives validation rules for fields of a form, and stores the validation rules as metadata in a memory. When values are later received based on the form, the values are validated using the rules in the metadata. Any errors detected are notified to a user system from which the values are received. The values are forwarded to a corresponding application if no errors are detected.

According to another aspect, a developer of the application provides an initial set of validation rules prior to the application being deployed at a customer site. The customer then specifies additional rules. The metadata stores both the initial rules and the additional rules. A user interface module validates each received value against any applicable rules present in the metadata.

According to yet another aspect, each validation rule may be specified associated with a set of users (e.g., in the form of role or list). Accordingly, a value submitted by a user is validated against only those rules that are specified as being applicable to the user.

According to one more aspect, each validation rule may be specified associated with a trigger field and a trigger value. The validation rule is then made applicable only if the received value corresponds to the associated trigger field and matches the trigger value.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
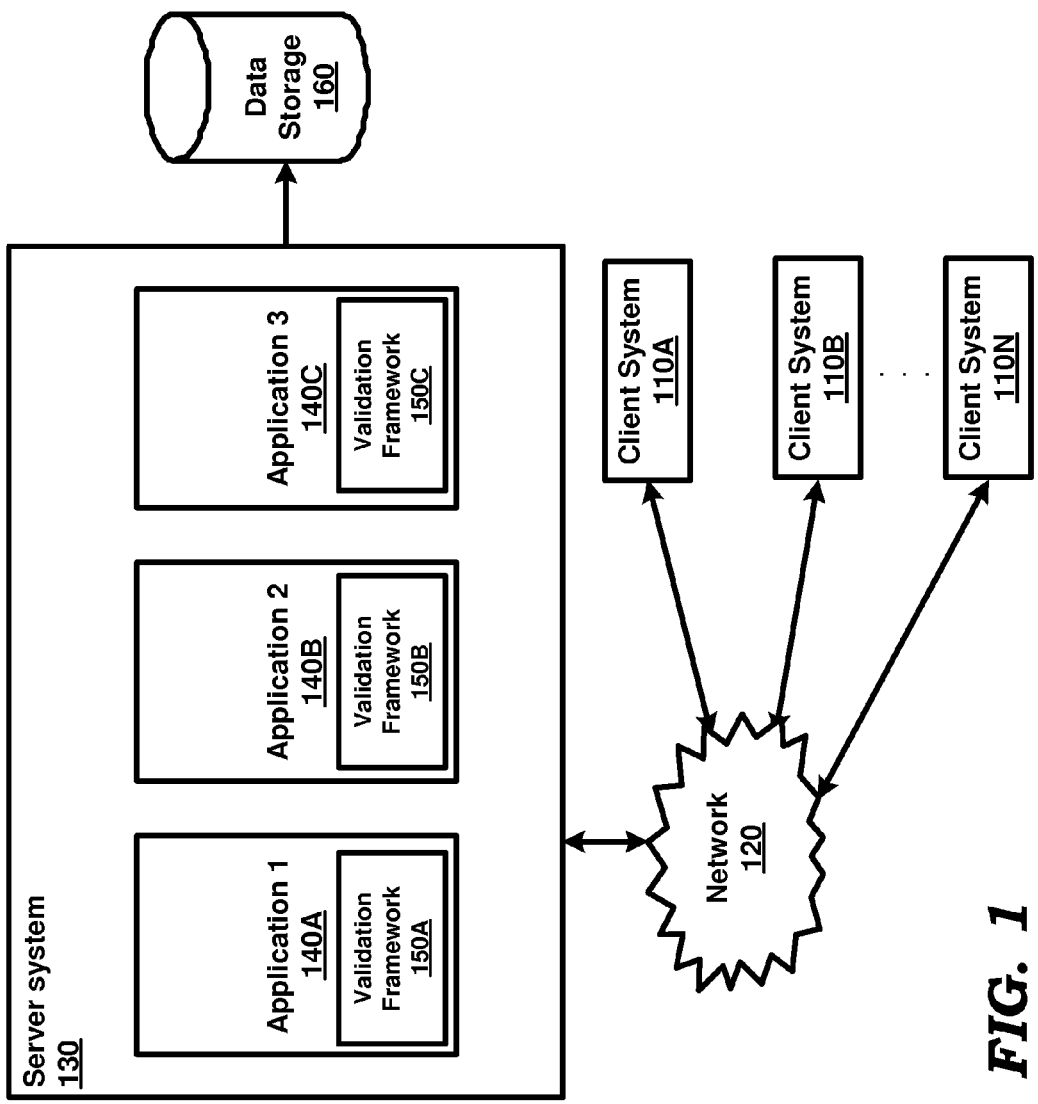
FIG. 1 is a block diagram illustrating an example computing system in which several aspects of the present disclosure can be implemented.

FIG. 1 is a block diagram illustrating an example environment in which several aspects of the present invention can be implemented. The block diagram is shown containing client systems 110A-110N, network 120, server system 130 executing applications 140A-140C, validation framework 150 and data storage 160.

Merely for illustration, only representative number/type of systems is shown in the figure. Many environments often contain many more systems, both in number and type, depending on the purpose for which the environment is designed. Each system/device of FIG. 1 is described below in further detail.

Network 120 provides connectivity between server system 130 and client systems 110A-110N and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by network 120. When the packet contains content such as port numbers, which specifies the destination application, the packet may be said to be directed to such application as well. The destination system may be required to keep the corresponding port numbers available/open, and process the packets with the corresponding destination ports. Network 120 may be implemented using any combination of wire-based or wireless mediums.

Data store 160 represents a non-volatile (persistent) storage facilitating storage and retrieval of data (such as tables supporting an enterprise application including data values entered for fields of forms, metadata for validation rules specified associated with fields of forms) by applications executing in server system 130. Data store 160 may be implemented as a corresponding database server using relational database technologies and accordingly provide storage and retrieval of data using structured queries such as SQL (Structured Query Language). Alternatively, data store 160 may be implemented as a corresponding file server providing storage and retrieval of data in the form of files organized as one or more directories, as is well known in the relevant arts.

Each of client systems 110A-110N represents a system such as a personal computer, workstation, mobile station, mobile phones, computing tablets, etc. provides user interfaces (for example, forms/web pages containing corresponding fields of forms of applications 140A-140C) to facilitate users to interact with applications 140A-140C and enter corresponding input values for the fields. Client system 110A-110N sends data values for fields of a submitted form for validation and may receive error messages when any of submitted values does not satisfy applicable criteria in the corresponding validation rules, to enable appropriate correction to the erroneous values.

Server system 130 represents a server, such as a web/application server, providing a shared environment for execution of various applications 140A-140C. Each of applications 140A-140C are described as being a constituent application of an enterprise application (from a vendor), though some/each can be stand-alone applications as well. Each of applications 140A-140C provides for display on client systems 110A-110N, forms containing corresponding fields, and processes the submitted values received as a response.

Each validation framework 150A-150C (referred individually or collective with numeral 150, as will be clear from the context) operates to validate at least some of the submitted values based on pre-specified validation rules, prior to such values being available for further processing by the corresponding constituent application. Validation framework 150 may be implemented based on hardware components such as processor(s) and memory storage(s), executing the appropriate instructions. Even though shown as a dedicated component in each of the applications, a common software module (e.g., provided in the form of a library) may be executed for all the applications together, with the validation rules being specific to each constituent application.

In an embodiment, the constituent applications 140A-140C are shipped by a vendor to several customers with a common set of validation rules for the submitted values. However, each customer may thereafter wish to add additional customizations to their specific environment, with the common and additional customizations operating to validate the submitted values. Aspects of the present disclosure provide at least for such addition of custom validation rules by each customer, as described below with examples.

3. Custom Validation Rules for Fields of Forms

FIG. 2 is a flow chart illustrating the manner in which values entered for fields of a form are validated according to an aspect of the present invention. The flowchart is described with respect to the systems of FIG. 1, in particular, validation framework 150A, merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, validation framework 150A enables specification of validation rules for fields of forms for a corresponding application. As used herein, a form refers to any page that is designed to be used for accepting user inputs. Each field may be specified associated with a corresponding set of validation rules, with each validation rule specifying criteria the value (of the field) is required to satisfy. Some of the validation rules may be provided by the vendor of the enterprise application, and more rules can be added by each customer in their respective environments. Any suitable user interface may be provided, though an example user interface is described in sections below for illustration.

In step 220, validation framework 150A stores specified validation rules as metadata. Storing as metadata implies that the rules are not 'hard coded' into the programming logic enforcing the rules, but instead the rules are stored in the form of data external to such programming logic such that the rules can be dynamically added, altered or deleted according to the specific requirements of the customer, without having to change the instructions constituting the programming language. The metadata may be stored, for example, as tables or using eXtensible Markup Language (XML) specification. It may be appreciated that the combination of steps 210 and 220 may be performed several times, as the forms continue to be presented to users in steps 230 onwards.

In step 230, application 140A sends a form to client system 110A on network 120. The form is typically sent as a user interacts with constituent application 140A. As may be readily appreciated, application 140A may have several forms, and the specific form sent depends on the context of interaction according to the functional logic of the constituent application.

In step 240, validation framework 150A receives the submitted values for fields of the form on network 120. Normally, a user enters values for various input fields of the form and selects (clicks on) a submit button to cause the values to be submitted, and thus received by validation framework 150A of server system 130.

In step 250, validation framework 150A validates the submitted values using validation rules in the metadata. Specifically, each received value is examined against the validation rules (specified associated with the corresponding field in the metadata) to check whether the value satisfies the criteria specified in each validation rule.

In step 260, control is passed to step 270 if errors are determined in the validation of step 250, and to step 280 otherwise. In step 270, validation framework 150A notifies the errors encountered, and control then passes to step 240, to possibly facilitate the user to provide acceptable values for the fields of the displayed form.

In step 280, server system 130 processes the submitted values in view of the values meeting the criteria specified by the validation rules. Such processing may entail, for example, mere storing of the values in data storage 160, or additional computations, etc., using the values. The flow chart then ends in step 299.

It may thus be appreciated that each customer is provided the flexibility to specify validation rules associated with any desired fields of forms corresponding to an application. The validation rules may be in addition to common validation rules a vendor of the enterprise application may provide. By storing all such validation rules as metadata, a common set of software instructions may be used for enforcing all such validation rules, as described below in further detail.

4. Server System

Figure 3A:
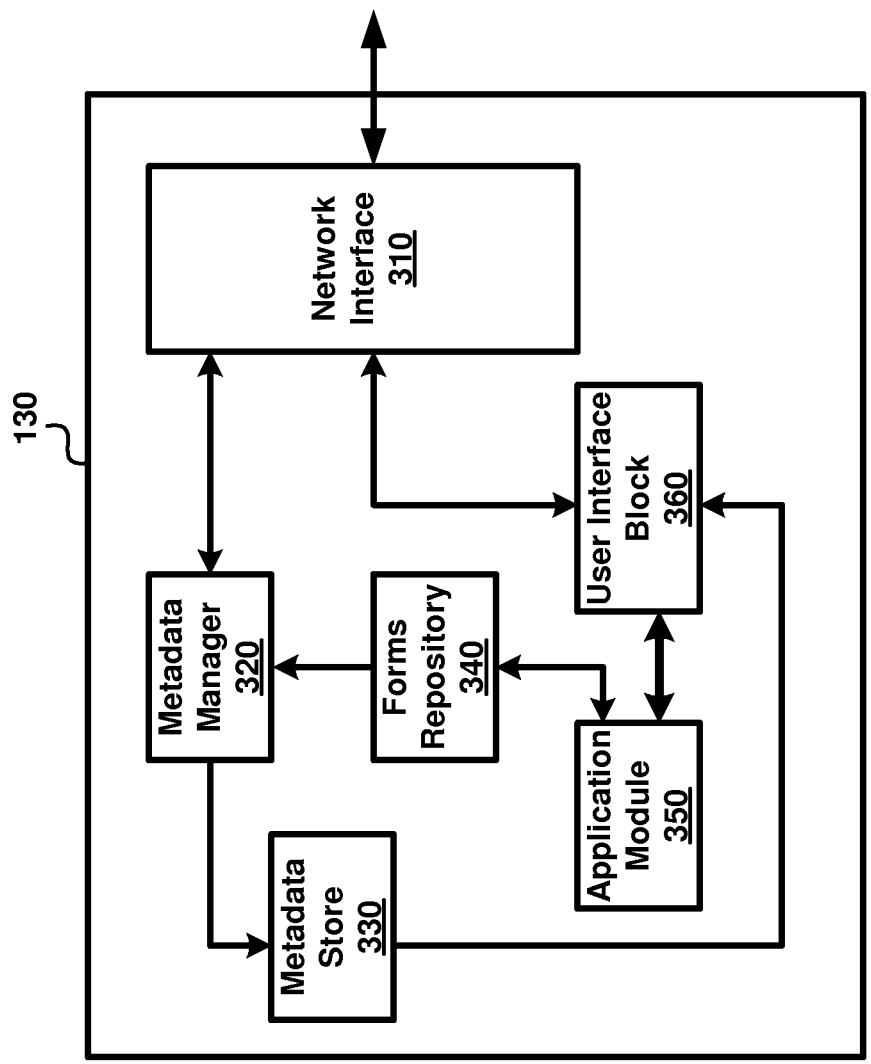
FIG. 3A is a block diagram illustrating the details of an enterprise application server system in an embodiment.

FIG. 3A is a block diagram illustrating the details of a server system as relevant to explanation of operation of forms, in an embodiment. Server system 130 is shown containing network interface 310, metadata manager 320, metadata store 330, forms repository 340, application module 350, and user interface 360. As will be clear from the description below, validation framework 150A may be viewed as containing metadata manager 320 (using some of forms 340), metadata store 330, and (parts of) user interface block 360. Each block is described below in further detail.

Network interface 310 provides electrical and protocol interfaces (e.g., network cards, network protocol stacks, etc.) to enable various blocks of server system 130 to communicate via network 120. In general, packets directed to server system 130 are examined for forwarding to the appropriate internal block/application. Similarly, network interface 310 sends packets directed to other external client systems shown in FIG. 1 (upon receipt of the corresponding packets, with identity of the target system, from the respective block). Network interface 310 may be implemented in a known way.

Figure 3B:
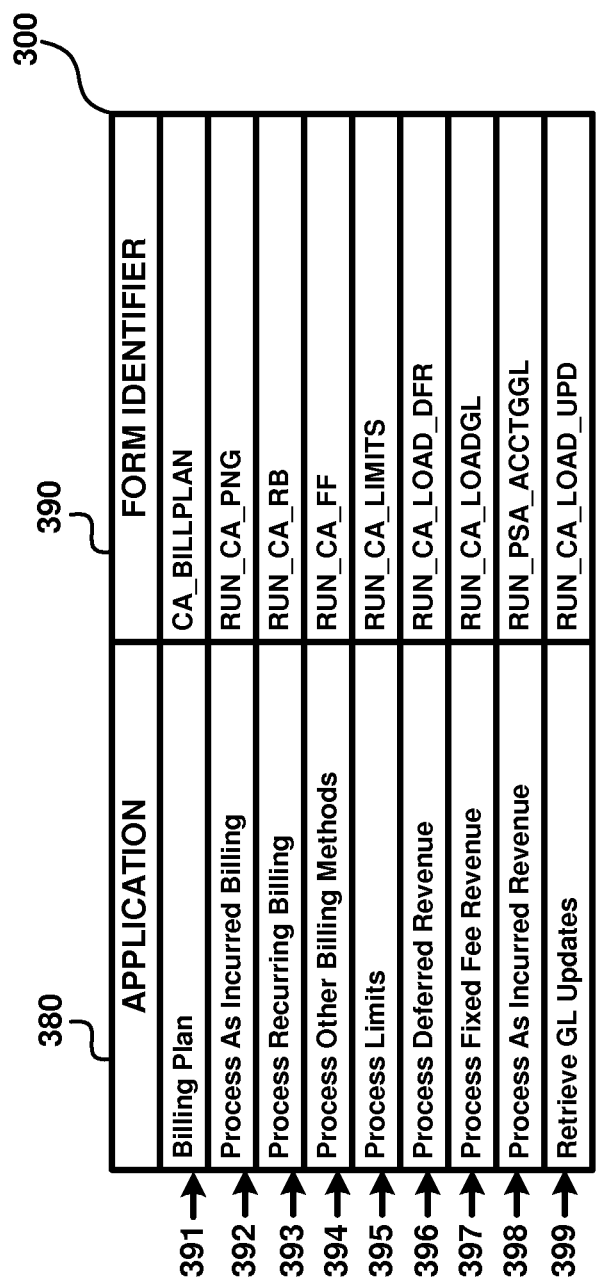
FIG. 3B depicts a table identifying the different forms available for applications in an embodiment.

Forms repository 340 represents a memory storing the definitions of various forms. Part of such data is identifiers of various forms available for respective applications, as depicted in the table of FIG. 3B. Table 300 is shown containing columns application 380 and form identifier 390 respectively indicating corresponding identifiers of application and form. Row 391 is shown specifying that application with identifier "Billing Plan" has an associated form with identifier "CA_BILLPLAN". Each of the remaining rows 392-399 represents a corresponding form associated with a respective application. However, in alternative embodiments, the data may be maintained using other data formats such as extensible markup language (XML), as will be apparent to one skilled in the relevant arts by reading the disclosure herein.

Forms repository 340 may further contain the definitions/templates for each of the forms. Each form definition may specify fields, attributes/operation (e.g., button, list, value) of each field, any association of the fields with respective columns in a table, etc. The forms may be encoded in conventions such as HTML. Some of the forms are served to users at client systems 110A-110N, while some may be used by metadata manager 320 to facilitate specifying of various validation rules, as described in sections below with examples.

Metadata store 330 represents a memory (hardware) storing the validation rules associated with various fields (of different multiple forms). The metadata can be stored, for example, using structures such as tables or according to XML, as will be apparent to a skilled practitioner by reading the disclosure herein. As noted above, the validation rules may be dynamically added, removed or changed, to facilitate customers to specify custom validation requirements of any desired fields.

Application module 350 represents the functional logic of one of the constituent applications of FIG. 1. Merely for conciseness, FIG. 3A is shown containing only a single module. Application module 350 retrieves the appropriate form from forms repository 340, incorporates values (potentially retrieved from data storage 160) into some of the display fields, and sends the form to user interface block 360. In response, application module 350 may receive the submitted values, after having passed the validation criteria. The validated values may be further processed, according to the functional requirements encoded into the programming logic of application module 350.

User interface block 360 serves the forms (to respective client systems) received from application module 350, and receives the submitted values. User interface block 360 then validates the received values using the applicable rules stored in metadata store 330. If any errors are encountered, an appropriate error message is sent to the client system, and the further corrected submitted values may be received thereafter. Once the submitted values satisfy any applicable criteria in the corresponding validation rules, the values are forwarded to application module 350.

Metadata manager 320 provided according to an aspect of the present disclosure, enables customers to specify validation rules. Such additional validation rules are added to metadata store 330. The operation of metadata manager 320 and the structure for metadata in an example environment are described below in further detail. First, an example form used as a reference, is described.

5. Example Form

FIG. 4 depicts the display of a form at client system 110A upon being sent by an application executing on server system 130, in an embodiment. The form is used to demonstrate some of the features of validation framework 150A. It has been assumed that the user has selected control "Billing plan general" (410) while interacting with application 140A executing on server system 130. Accordingly, a corresponding form is sent to client system 110A.

It is assumed that the form associated with menu choice "Billing Plan General" (410) is "CA_BILLPLAN" (450) and accordingly display area 400 is shown containing corresponding fields of the form. As may be appreciated the form displayed contains values for some of the fields, while for some of the other fields, the user may enter corresponding values.

Display portion 490 represents a control containing options "Submit/Save" (490A) and "Cancel" (490B). A user may select "Submit/Save" (490A) in order to submit values entered for fields in form "CA_BILLPLAN" or may select control "cancel" in order to reset the values entered in fields of the form. On user selecting control "Submit/Save" (490A), data values with corresponding fields of the form are sent (via network 120) for processing by a corresponding application.

According to an aspect of the present disclosure, values for fields of the submitted form are validated. As described above with respect to step 250, each received value is examined against the validation rules (specified associated with the corresponding fields) to check whether the value satisfies the criteria specified in each validation rule, for subsequent processing of values for fields.

The description is continued with an illustration of the manner in which validations rules for fields of forms may be specified.

6. Specifying Validation Rules

FIGS. 5A-5D together illustrates an example approach in which server system may enable a customer to specify validation rules in an embodiment. For conciseness, only portions relevant to validation are described below.

According to an aspect of the present disclosure, a customer is enabled to specify in a validation rule, corresponding identifiers of fields of a form and the criteria any input values are to satisfy. The criteria may specify any suitable conditions, and includes specification of allowable values/range of values for the field, whether an input value is mandatory for the field (and if so, under what specific conditions), etc.

Validation framework 150 (operates in conjunction with application 140A) may permit customer for an enterprise application to specify validation rules for fields of forms associated with any of constituent applications. Validation framework provides on a display unit connected to any of system connected to server system 130 including client systems 110A-110N a user interface for a customer to specify validation rules.

Display portion 500 is shown containing text controls 510 labeled "Template Id", 520A-520C respectively labeled "Security Template Type", "Description", "Role Name", 530 labeled "Status", 550 labeled "Component Name", 555A/555B respectively labeled "Trigger Field", "Value to Match", 560A/560B both labeled "Field List", 570 labeled "Value Edits", and option controls 580A labeled "Validation Template" and 580B labeled "User List".

In the present embodiment, a customer is enabled to specify each validation rule to contain identifiers for a validation rule, form of interest, specific fields of interest in the form, and corresponding permissible values/range of values for the fields of interest.

Display field 510 indicates a text control using which a customer may indicate an identifier for the validation rule being specified. It may be observed that the customer has provided a value of the identifier as "BILLING PLAN" (510). Thus each criteria associated are identified with the identifier indicated.

Figure 5D:
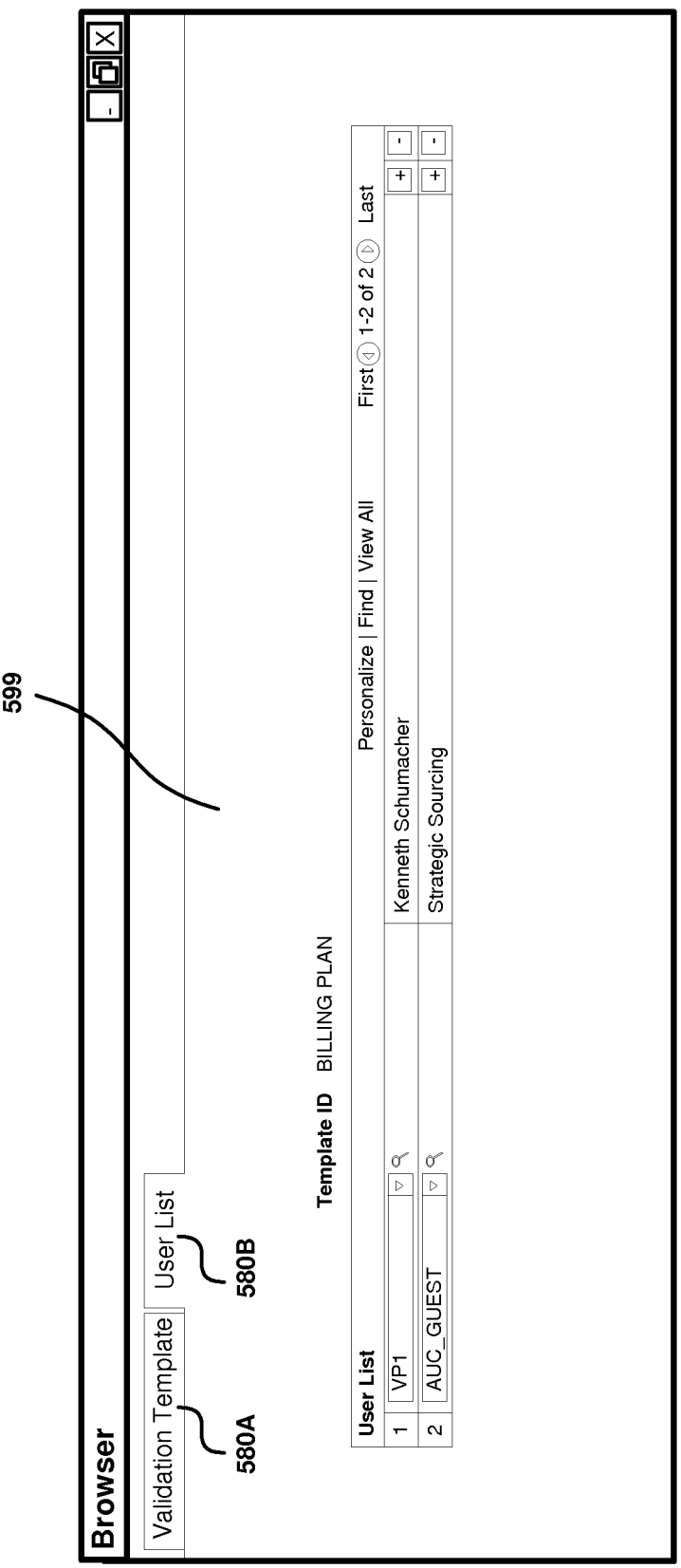

Display fields 520A, 520B, and 520C together indicate that the customer has specified that the validation rule is applicable only when users having role of a 'cash manager' submit values. In the alternative, the customer may indicate interest to specify a list of users using 520A, in which case the display of FIG. 5D is shown (associated with tab 'User list' at 580B), for the customer to select specific users of interest. The user may select the users of interest and select save, to complete specifying the list of users.

Continuing with FIG. 5A, field 530 is shown set to 'Active' status to indicate that the validation rule is operative upon being saved. An alternative value 'inactive' indicates that the rule is in the process of being developed, and should not be used to validate values.

Display field 550 (labeled "Component name") contains a text control using which a customer may indicate an identifier of a form, for which the present validation rule is sought to be specified. The information in table 3B may be conveniently made available for selection of a desired form. The customer is shown to have indicated a value of component as "CA_BILLPLAN". The description is accordingly continued with an illustration, in which a customer provides additional criteria associated with the validation rule "BILLING PLAN", for various fields of the form "CA_BILLPLAN".

Trigger field 555A and (Trigger) Value to Match field 555B enable a customer to specify a condition in which the subject validation rule is to be applied. It is shown that the customer has specified "Billing Status" (555A) and "RDY" (555B) indicating that the subject validation rule is to be applied only when Billing Status field (of FIG. 4A) has a value "RDY".

Display portions 560A and 560B together specify any required fields under applicable conditions. According to a convention, the fields within each combination are required with an AND condition, and only one of the combinations is required (i.e., OR condition). Thus, the customer is shown to have indicated that one of the two below combination is required: (1) PAYMENT_METHOD" and "PAYMENT_TERMS_CD" fields, or (2) field "BILL_CYCLE_ID".

FIG. 5B depicts the manner in which a user can select each field of portions 560A/560B. Metadata manager 320 causes the display of pop-up 575 when the customer clicks on select control 565A of FIG. 5A. Pop-up 575 contains display portion 590 listing the fields of the component form selected at 550 in FIG. 5A. The list may be displayed based on the information commonly stored associated with forms definition in forms repository 340. The selections 552A and 552B of FIG. 5B are thereafter reflected as shown in portion 560A of FIG. 5A (as shown at 565C). The field corresponding to portion 560B can be similarly selected.

Continuing with reference to FIG. 5A, portion 570 illustrates the manner in which the permissible values are specified for each field. Each row contains a field and a secure list, as shown at 570A and 570B respectively. The field represents one of the fields of the form specified by the user, and the secure list specifies the permissible values for the field.

FIG. 5C depicts the manner in which permissible values can be specified for a field (potentially prior to usage at 570B of FIG. 5A). As shown in portion 595B, a range of values can be specified, and as shown in portion 595C, a list of permissible values can be specified in addition. The secure list id 595A can be conveniently used in FIG. 5A, as shown at 570B.

A customer may save a validation rule by selecting corresponding control ("Save") from display portion 590. On selecting control 590, according to an aspect of the present invention, a validation rule is saved as metadata in metadata store 330.

The description is continued with an illustration of the manner in which specified validation rules may be stored as metadata in an embodiment.

7. Metadata

FIGS. 6A and 6B together illustrates the manner in which validation rules are maintained in one embodiment. While the metadata is shown stored in the form of tables for illustration, the management data may be maintained in any other format such as XML (Extensible Markup Language), as will be apparent to one skilled in the relevant arts by reading the disclosure herein.

Broadly, FIG. 6B stores the criteria information shown in portions 560A, 560B and 570, while FIG. 6A stores the remaining information of the validation rule. With respect to table 600 of FIG. 6A, row 651 is shown storing the information corresponding to fields 510, 520A, 530, and 520C in respective columns 662, 663, 664 and 665 respectively (to indicate that the rule is for the specific form, that the rule is active and that the rule is applicable only when Cash Managers submit values). Columns 667-670 respectively specify the identifier of the person/customer creating the rule, time stamp of creation, last person updating the rule, and the time stamp of last update. Columns 671 and 672 store the values specified at 555A and 555B of FIG. 5A. Column 666 specify a brief description of the validation rule.

It may be appreciated that rolename 665 represents a set of users, in that the set contains only those users that are indicated to have the corresponding role. However, alternative approaches (and corresponding data structures) can be used to indicate the set of users (e.g., in the form of a list corresponding to FIG. 5D) that the validation rule is applicable to, as will be apparent to a skilled practitioner by reading the disclosure herein.

With respect to table 650 of FIG. 6B, the combination number of 1 in rows 601 and 602 indicates that the two criteria together forms a single combination corresponding to display area 560A. The criteria of row 603 corresponds to display area 560B. As may be readily observed, the values in columns 612-617 respectively store values corresponding to 510, 550, 551A/551B, 565B, 565C and 565D.

Though the tables of FIGS. 6A and 6B are shown representing only the validation rule specified in FIG. 5A, it should be appreciated that the tables would have other rows filled/stored with validation rules initially provided by the developer of the enterprise application of FIG. 1. Thus, the validation rules are added by each customer to their own deployment instance, in accordance with the interface shown in FIG. 5A. The aggregate rules that operative in each customer environment therefore is the initial set possible shipped by the vendor/developer of the enterprise application, in addition to the rules added by the corresponding customer.

In addition, though shown as multiple instances of validation frameworks in FIG. 1, it may be appreciated that each such instance is supported by the same functional logic and thus all instances of validation frames 150A-150C may be implemented based on execution of the same set of software instructions. However, each instance operates on the corresponding metadata.

In operation, when a submitted value is received associated with a field, user interface block 360 validates the submitted values in accordance with validation rules specified by customers and stored in the metadata (including those stored in tables 600 and 650 of FIGS. 6A and 6B respectively). In particular, user interface block 360 may examine table 650 to identify the validation rules applicable for the field, and then examines table 600 to identify which of the validation rules (subset) are applicable to the user (from whom the value is received). The received value is validated against the rules in the subset only (i.e., those applicable to the user/field combination) subject to satisfying any additional constraints specified by columns 671/672 (trigger field and trigger value combination). User interface block 360 may validate the submitted value against other rules specified by customers, in accordance with the user interfaces described above. The validation operation is illustrated with an example in FIGS. 6A and 6B together.

8. Validation of Data

FIG. 7 depicts a user having entered values for fields of FIG. 4, and is assumed to have submitted the values by using the Save option. User interface 360 receives the submitted values, and identifies that the validation rule stored in tables of FIGS. 6A/6B is applicable for the data, based on the form identifier 450, etc.

Figure 8:
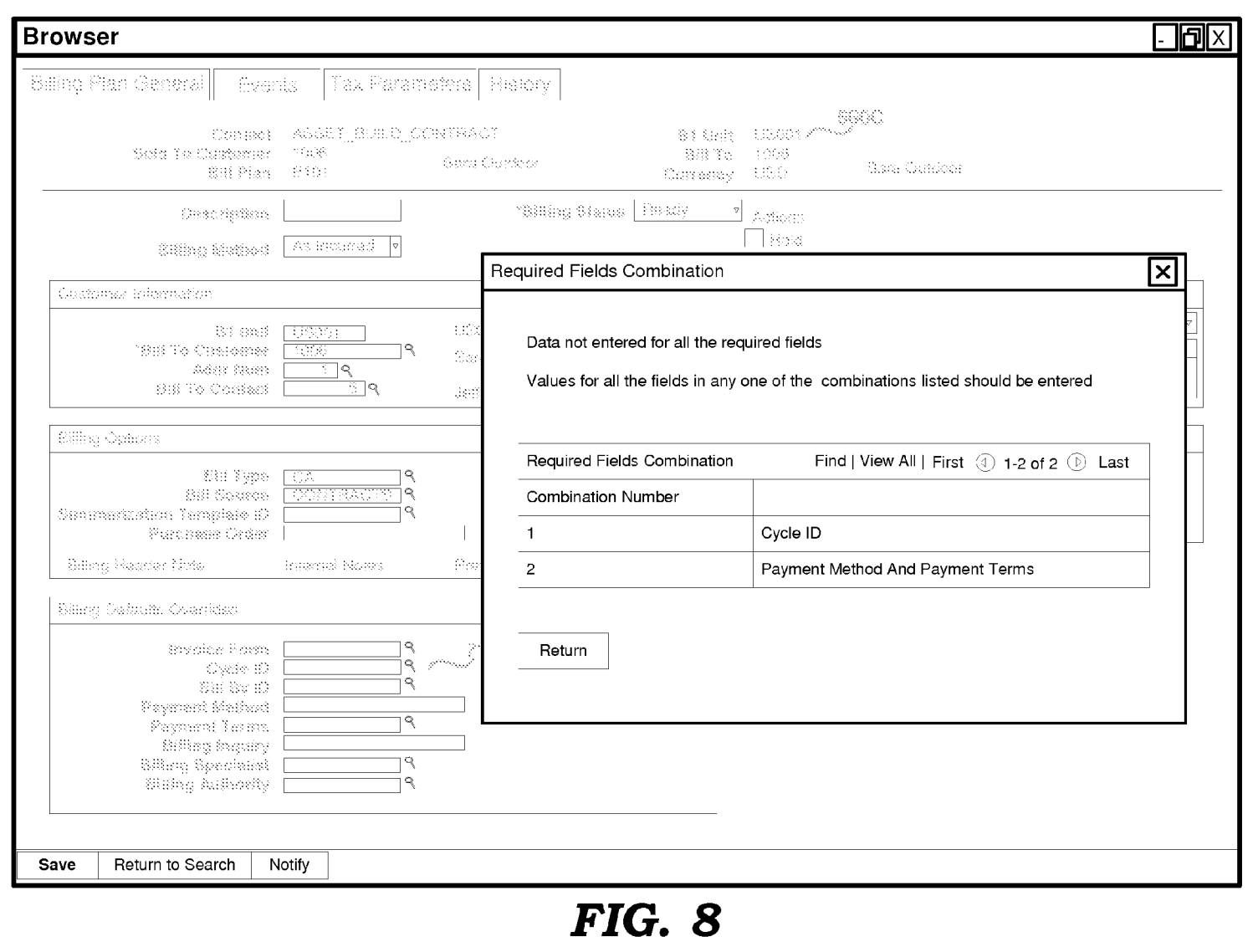

User interface 360 examines the submitted values against the criteria specified in rows 601-603 of FIG. 6B, and determines that the rule corresponding to portions 560A/560B is violated since no data is shown entered for fields 712-714. A corresponding error is shown displayed in FIG. 8, forcing the user to comply.

After the user satisfies the criteria in all applicable validation rules, user interface 360 forwards the corresponding received values to application module 350 for further processing.

It may accordingly be appreciated that customers can dynamically add validation rules, as suitable in their environments. In view of such rules being stored in the form of metadata external to application logic, the customers are provided the convenience of easily adding such rules.

9. Digital Processing System

Figure 9:
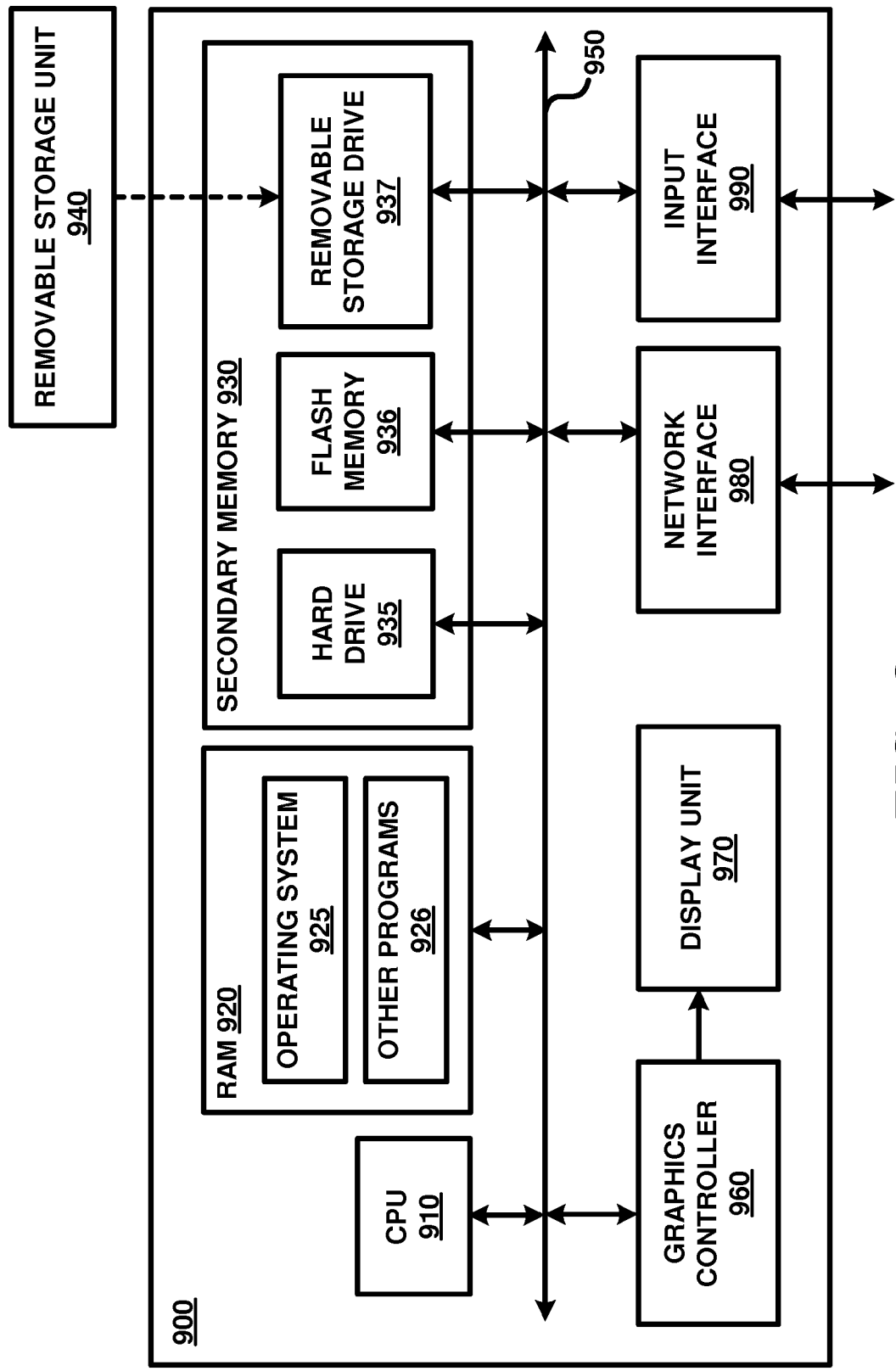
FIG. 9 is a block diagram illustrating the details of a digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 may correspond to each of server system 130 and client system 110A-110N. Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting operating system 925 and/or other user programs 926 (such as the applications and validation framework, etc.). In addition to operating environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals. Each of the displays shown in FIGS. 4A, 5A-5D, 7 and 8 corresponds to an image screen displayed at corresponding time duration on the display screen. Input interface 990 may correspond to a keyboard and a pointing device (e.g., touch-pad, mouse) and may be used to provide inputs (such as those provided by customers and users, as described above). Network interface 980 provides connectivity to a network (e.g., using Internet Protocol), and may be used to communicate with other systems connected to the network.

Secondary memory 930 may contain hard drive 935, flash memory 936, and removable storage drive 937. Secondary memory 930 may store the data (for example, metadata of FIGS. 6A/6B, etc.) and software instructions (for implementing each instance of validation framework 150), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Secondary memory 930 may contain hard drive 935, flash memory 936, and removable storage drive 937. Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of providing values to applications, said method comprising:
   receiving validation rules for a set of fields of a form, a first set of validation rules of said validation rules being received for a first field of said set of fields, each validation rule of said first set of validation rules specifying a corresponding pre-specified criteria that a data entered for said first field is required to satisfy;
   storing said validation rules as metadata in a memory, wherein said validation rules are received indicating a set of users each of said validation rules is applicable to, said metadata also storing the set of users for whom the corresponding validation rule is applicable, wherein said metadata indicates that a subset of said first set of validation rules is applicable to a user,
   wherein said subset includes a first validation rule and a second validation rule, said second validation rule specifying a trigger field of said set of fields and a trigger value associated with said trigger field, wherein said trigger field and said trigger value are stored associated with said second validation rule in said metadata, said first validation rule having no associated trigger field in said metadata;
   sending to a user, said form associated with an application, wherein said form including said first field and said trigger field, is displayed to said user;
   receiving a first value submitted by said user as said data for said first field and a second value submitted by said user for said trigger field based on said displayed form;
   checking whether said second value received using said form for said trigger field matches said trigger value;

validating said first value using said first validation rule indicated to be applicable to said first field for said user without any associated trigger field in said metadata,
wherein said validating using said second validation rule is performed only if said checking determines that said second value matches said trigger value in view of said second validation rule indicating said trigger field,
wherein said validating of said first value against a validation rule determines that said first value satisfies said pre-specified criteria of the validation rule or indicates an error otherwise;
if one or more errors are found by said validating, notifying said user of said errors, or else forwarding said first value to said application for processing.

2. The method of claim 1, wherein a developer of said application provides an initial set of validation rules, said validation rules being received from a customer deploying said application,
said metadata containing a plurality of validation rules including said initial set of validation rules and said validation rules,
wherein said validating validates each submitted value against any applicable validation rules of said plurality of validation rules,
whereby said customer is enabled to add custom validation rules after deployment of said application.

3. The method of claim 2, wherein said metadata is stored on a server system from which said form is served to a client system using which said user interacts with said application, wherein said validating is performed at said server system.

4. The method of claim 3, further comprising providing a user interface to enable said customer to provide said validation rules, wherein said user interface comprises:
examining a definition of said form to identify a list of fields present in said definition; and
sending said list to said customer such that said customer can select from said list of fields when adding said custom validation rules after deployment of said application.

5. The method of claim 2, wherein said server system executes a plurality of applications including said application, wherein metadata is stored for each of said plurality of applications to represent corresponding validation rules, wherein a common set of instructions is executed for performing said validating based on corresponding validation rules.

6. The method of claim 2, wherein a fifth validation rule of said first set of validation rules specifies that an acceptable value for said first field is one value of both of a list of values and a range of values.

7. The method of claim 2, wherein a third validation rule of said first set of validation rules specifies a field for which value is mandatory.

8. The method of claim 2, wherein said receiving receives a plurality of values including said first value,
wherein a fourth validation rule of said first set of validation rules specifies a first combination of fields and a second combination of fields, said fourth validation rule requiring said plurality of values to contain values for all fields in either said first combination of fields or said second combination of fields.

9. A non-transitory machine readable medium storing one or more sequences of instructions for enabling a system to provide values to application, wherein execution of said one or more instructions by one or more processors contained in said system enables said system to perform the actions of:

receiving validation rules for a set of fields of a form, a first set of validation rules of said validation rules being received for a first field of said set of fields, each validation rule of said first set of validation rules specifying a corresponding pre-specified criteria that a data entered for said first field is required to satisfy;
storing said validation rules as metadata in a memory, wherein said validation rules are received indicating a set of users each of said validation rules is applicable to, said metadata also storing the set of users for whom the corresponding validation rule is applicable, wherein said metadata indicates that a subset of said first set of validation rules is applicable to a user,
wherein said subset includes a first validation rule and a second validation rule, said second validation rule specifying a trigger field of said set of fields and a trigger value associated with said trigger field, wherein said trigger field and said trigger value are stored associated with said second validation rule in said metadata, said first validation rule having no associated trigger field in said metadata;
sending to a user, said form associated with an application, wherein said form including said first field and said trigger field, is displayed to said user;
receiving a first value submitted by said user as said data for said first field and a second value submitted by said user for said trigger field based on said displayed form;
checking whether said second value received using said form for said trigger field matches said trigger value;
validating said first value using said first validation rule indicated to be applicable to said first field for said user without any associated trigger field in said metadata,
wherein said validating using said second validation rule is performed only if said checking determines that said second value matches said trigger value in view of said second validation rule indicating said trigger field,
wherein said validating of said first value against a validation rule determines that said first value satisfies said pre-specified criteria of the validation rule or indicates an error otherwise;
if one or more errors are found by said validating, notifying said user of said errors, or else forwarding said first value to said application for processing.

10. The machine readable medium of claim 9, wherein a developer of said application provides an initial set of validation rules, said validation rules being received from a customer deploying said application,
said metadata containing a plurality of validation rules including said initial set and said validation rules,
wherein said validating validates each submitted value against any applicable validation rules of said plurality of validation rules,
whereby said customer is enabled to add custom validation rules after deployment of said application.

11. The machine readable medium of claim 10, wherein a fourth validation rule of said first set of validation rules specifies that an acceptable value for said first field is one value of both of a list of values and a range of values.

12. The machine readable medium of claim 10, wherein said receiving receives a plurality of values including said first value,
wherein a third validation rule of said first set of validation rules specifies a first combination of fields and a second combination of fields, said third validation rule requiring said plurality of values to contain values for all fields in either said first combination of fields or said second combination of fields.

13. A digital processing system comprising:
a memory to store instructions;
a processor to retrieve said instructions and execute the retrieved instructions, wherein execution of the retrieved instructions causes said digital processing system to perform the actions of:
receiving validation rules for a set of fields of a form, a first set of validation rules of said validation rules being received for a first field of said set of fields, each validation rule of said first set of validation rules specifying a corresponding pre-specified criteria that a data entered for said first field is required to satisfy;
storing said validation rules as metadata in a memory, wherein said validation rules are received indicating a set of users each of said validation rules is applicable to, said metadata also storing the set of users for whom the corresponding validation rule is applicable, wherein said metadata indicates that a subset of said first set of validation rules is applicable to a user,
wherein said subset includes a first validation rule and a second validation rule, said second validation rule specifying a trigger field of said set of fields and a trigger value associated with said trigger field, wherein said trigger field and said trigger value are stored associated with said second validation rule in said metadata, said first validation rule having no associated trigger field in said metadata;
sending to a user, said form associated with an application, wherein said form including said first field and said trigger field, is displayed to said user;
receiving a first value submitted by said user as said data for said first field and a second value submitted by said user for said trigger field based on said displayed form;
validating said first value using said first validation rule indicated to be applicable to said first field for said user without any associated trigger field in said metadata,
wherein said validating using said second validation rule is performed only if said checking determines that said second value matches said trigger value in view of said second validation rule indicating said trigger field,
wherein said validating of said first value against a validation rule determines that said first value satisfies said pre-specified criteria of the validation rule or indicates an error otherwise;
if one or more errors are found by said validating, notifying said user of said errors, or else forwarding said first value to said application for processing.

14. The digital processing system of claim 13, wherein a developer of said application provides an initial set of validation rules, said validation rules being received from a customer deploying said application,
said metadata containing a plurality of validation rules including said initial set and said validation rules,
wherein said validating validates each submitted value against any applicable validation rules of said plurality of validation rules,
whereby said customer is enabled to add custom validation rules after deployment of said application.

15. The digital processing system of claim 14, wherein said server system executes a plurality of applications including said application, wherein metadata is stored for each of said plurality of applications to represent corresponding validation rules, wherein a common set of instructions is executed for performing said validating based on corresponding validation rules.

16. The digital processing system of claim 13, further comprising providing a user interface to enable said customer to provide said validation rules, wherein said user interface comprises:
examining a definition of said form to identify a list of fields present in said definition; and
sending said list to said customer such that said customer can select from said list of fields when adding said custom validation rules after deployment of said application.

17. The digital processing system of claim 13, wherein a fourth validation rule of said first set of validation rules specifies that an acceptable value for said first field is one value of both of a list of values and a range of value, and wherein a third validation rule of said first set of validation rules specifies a field for which value is mandatory.

* * * * *